F. A. CRITZ, Jr.
STOOK TROUGH.
APPLICATION FILED MAY 21, 1912.
1,063,661.
Patented June 3, 1913.
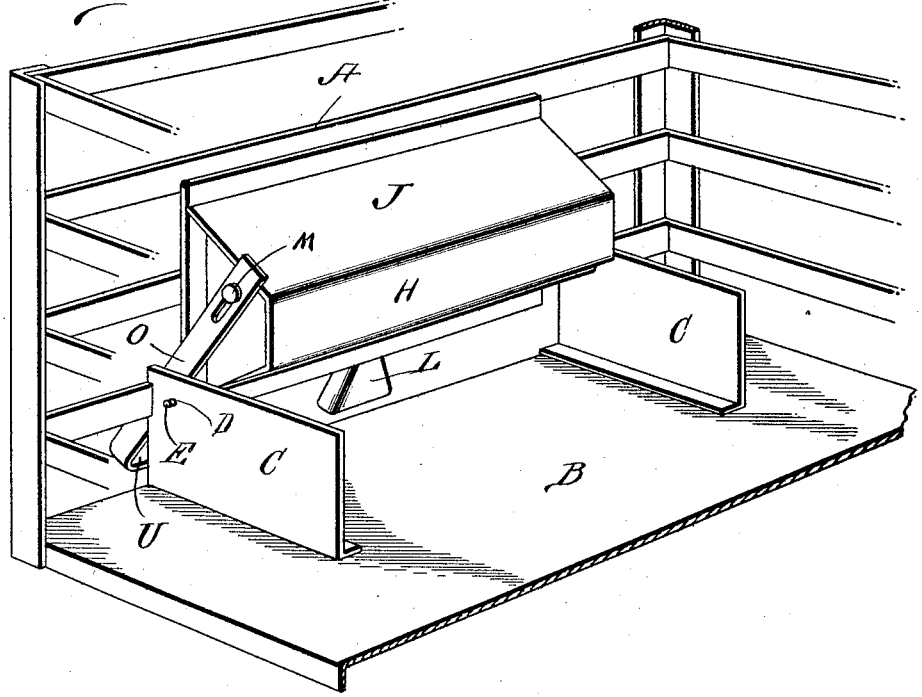
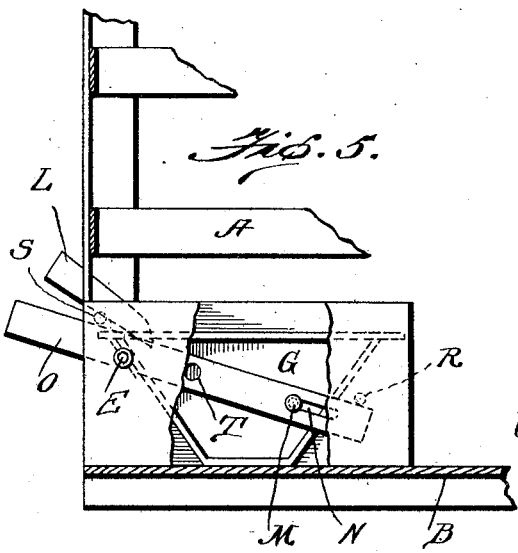
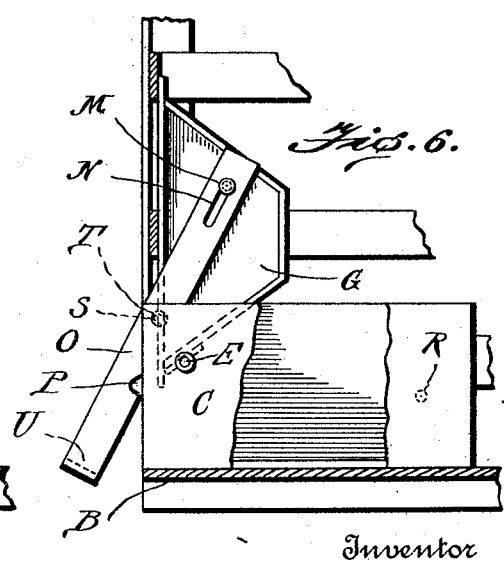

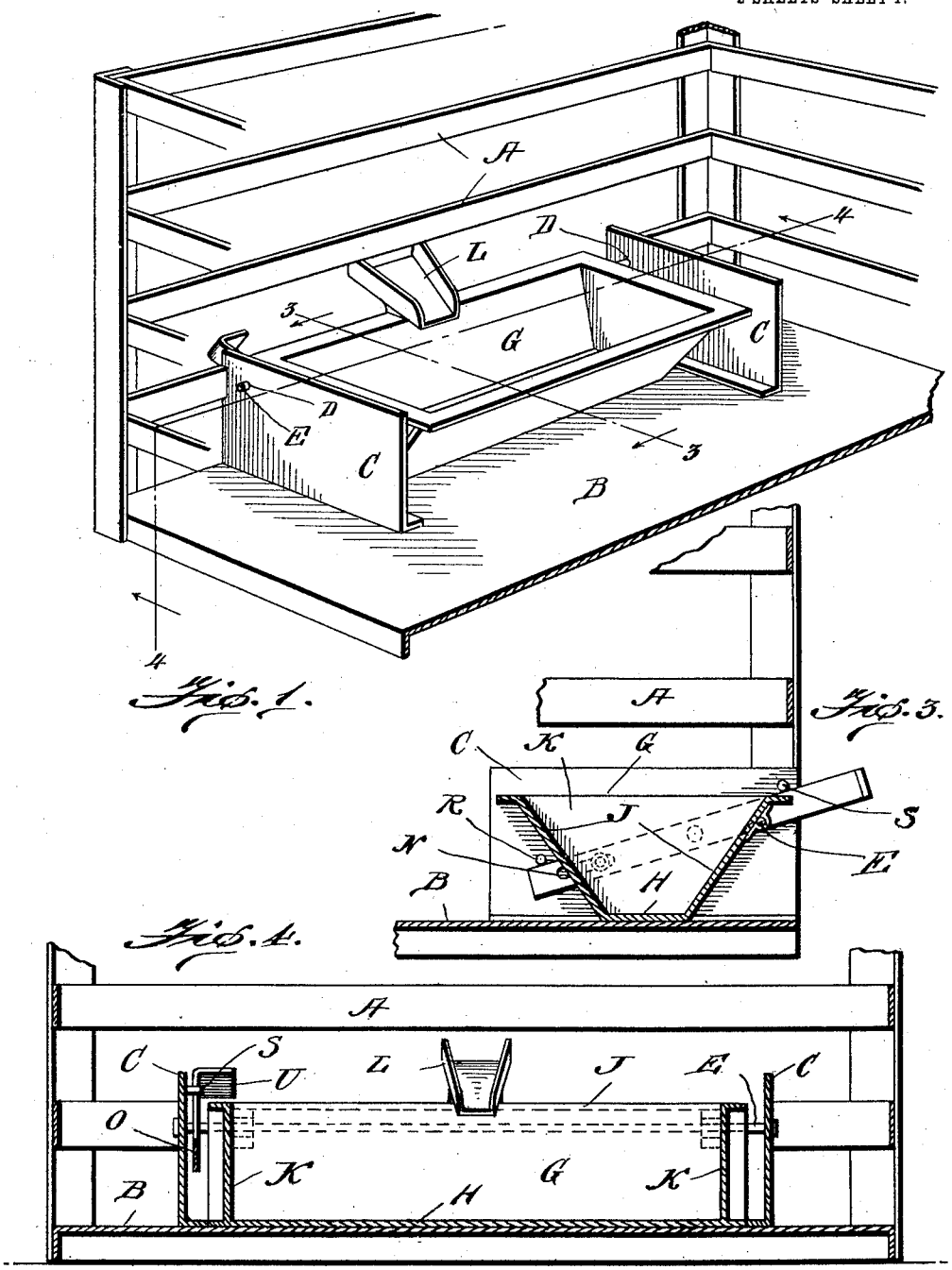

UNITED STATES PATENT OFFICE.

FRANK A. CRITZ, JR., OF WEST POINT, MISSISSIPPI.

STOCK-TROUGH.

1,063,661.　　　　Specification of Letters Patent.　　Patented June 3, 1913.

Application filed May 21, 1912.　Serial No. 698,719.

*To all whom it may concern:*

Be it known that I, FRANK A. CRITZ, Jr., a citizen of the United States, residing at West Point, in the county of Clay and State of Mississippi, have invented certain new and useful Improvements in Stock-Troughs, of which the following is a specification.

My invention relates to improvements in stock troughs, and refers particularly to a combined water and feed trough especially adapted for feeding and watering hogs, although the improvement may be employed conveniently in the feeding and watering of other domestic animals, and in fact may be used in any capacity where it would perform its functions in an efficient and practical manner.

The primary object of the invention is the provision of a stock trough capable of a dumping or tilting action whereby access to the trough for the purpose of cleaning the same may be had without necessitating the entrance into the inclosure or pen of the person performing the cleaning.

Another object of the invention is the provision of a stock trough provided with a feed chute discharging therein whereby feed may be fed to the animal in such a manner as to prevent the animal from placing his head under the flow of feed, thereby preventing undue waste of the feed.

A further object of the invention is the provision of a stock trough which may be locked while in its normal position to prevent the trough from tilting over, and which trough may be locked in its raised position to permit a ready and thorough cleaning of the same by a person working from without the inclosure.

A further object of the invention is to provide an extremely efficient form of operating lever for tilting the trough upon its pivot, which lever may be operated from without the inclosure and can be locked to prevent the animal within the inclosure from tilting the trough.

To attain the desired objects, the invention broadly stated resides in the provision of a stock trough pivotally mounted upon supports, an operating lever secured to one end of the trough, and means carried by one of the supports for locking the trough in both raised and lowered or normal position.

The invention further resides in the provision of a stock trough embodying certain novel features of construction and combinations of parts, substantially as shown, described and claimed hereinafter, reference being had to the accompanying drawings in which—

Figure 1 is a perspective view of a stock trough constructed in accordance with and embodying the principles of my invention, the trough being in normal or lowered position. Fig. 2 is a similar view showing the trough in raised position or in the position the parts assume when the trough is being dumped or cleaned. Fig. 3 is a transverse section along line 3—3 of Fig. 1. Fig. 4 is a longitudinal section along line 4—4 of Fig. 1. Fig. 5 is an end elevation of the operating lever and a portion of the trough, the lever being shown locked in normal position, and Fig. 6 is a similar view showing the trough locked in raised position.

In the drawings:—The letter A designates the rails of a pen or inclosure from the floor or bottom B of which rises the pair of supports C, having bearings D in which are mounted the ends of the pivoted rod E, passing through bearings F formed on one wall of the stock trough G, of any suitable and desired shape or material, but preferably constructed as shown in the drawings and comprising a bottom wall H, from which diverge side walls J, connected by end walls K, one of the side walls being provided with a feed chute L projected outwardly and upwardly therefrom beyond the inclosure and discharging into the trough at an angle. From this construction, it will be seen that the bottom wall of the trough normally rests upon the floor of the inclosure and that the trough is pivoted to the supports C by means of the rod E and is capable of a rocking or tilting action to enable it to be more readily cleaned.

Formed upon one of the end walls of the trough is a headed stud M, working in an elongated slot N, formed near the inner end of the operating lever O, the outer end of which is notched at P to normally engage the pivot rod E. A lug R is projected inwardly from the adjacent support C in such a manner as to lie in the path of the lower end of the operating lever and thereby prevents the animal from striking against the lever to move the same, while a second lug S is formed upon the support near the upper end of the lever and engages a hole T in the lever to lock the same in raised position. A handle U is formed on the lever at its upper end and preferably projects between the rails of the inclosure so as to be easily operable from without the inclosure. To operate the lever, it must be first withdrawn from its engagement with the pivot rod, then pulled back upon by the operator to clear the lug R, the slot and stud connection affording a sufficient play for this purpose. The trough is now raised into the position shown in Fig. 2 and the hole T in the lever engaged by the alining lug S and the lever and trough thus locked in raised position, the slot and stud connection permitting a slight lateral movement of the lever. It will thus be seen that the pin S and hole T serve to lock the trough in raised position. Movement of the lever by an animal, when the trough is in normal position, is prevented by the lug R which lies in the path of the lever. To clear this lug, it is necessary that the lever be first given a side or lateral movement. This lateral movement can only be had when the lever notch P is disengaged from the pivot rod E, which disengagement can only be effected from without the pen by reason of the fact that the abrupt edge of the notch is disposed so as to prevent clearance of the notch from the rod from within by an animal. The upsetting of the trough by an animal is thus made impossible by notch P, rod E, and lug R, while the slot and stud connection M and N permits the slight lateral movement of lever O necessary to clear said lug R. The lever, when lug R has been cleared, is rocked to raise the trough to the position shown in Fig. 2, where lug S is engaged in hole T to lock said lever in position.

From the foregoing description, taken in connection with the accompanying drawings, the construction and operation of my improvements will be readily understood, and it will be apparent that I have provided extremely simple, efficient and durable means for accomplishing the objects hereinbefore stated.

I claim:—

1. In a stock trough, the combination with spaced supports, a rod connecting said supports, a trough pivoted thereon, a member on one of the supports, a lever having a slot and stud connection with the trough to permit sufficient play to clear said member on the support, and a locking member for said lever.

2. In a stock trough, the combination with supports, of a trough pivoted therebetween, a lug on one of said supports, an operating lever having a slot and stud connection with the trough to permit a sufficient play to clear said lug, and a locking pin to engage a hole in said lever to lock the lever in raised position.

3. In a stock trough, in combination, spaced supports, a rod arranged therebetween, a trough on said rod, a lever for said trough, said lever having a notch engaging over the rod, and a lug on one of the supports coöperating with said notch to prevent the raising of the trough by an animal.

4. In a stock trough, in combination, spaced supports, a rod therebetween, a stock trough on said rod, a lever for said trough, said lever having a slot and stud connection with the trough to permit a sufficient play thereof, and a lug on one of said supports disposed in the path of the lever to be cleared by said lever by reason of its lateral play.

5. In a stock trough, in combination, spaced supports, a rod journaled therein, a trough on said rod, a lever having a notch normally engaging over said rod, a lug on one of said supports, said lever having a slot and stud connection to permit a sufficient play to clear said lug, and a locking pin adapted to engage a hole in said lever to lock the same in raised position.

6. In a stock trough, in combination, spaced supports, a rod journaled therein, a trough on said rod, a locking pin on one of said supports, and a lever for raising and lowering said trough, said lever having a hole into which the locking pin fits when said lever is in raised position.

7. In a stock trough, in combination with spaced supports, a trough pivoted therebetween, a lever therefor, said lever having a notch and a hole therein, a lug on one of said supports, and coöperating with the notch of said lever, said lever having a pivot rod normally engaged by said notch, and a locking member to fit in said hole in said lever when the lever is raised.

8. In a stock trough, the combination with spaced supports, of a rod journaled therein, a trough mounted on said rod, a lever having a notch normally engaging said rod, said lever having a slot therein, a stud formed on one wall of the trough and engaging the slot in said lever, and a lug coöperating with said notch of the lever for preventing the operation of the lever by an animal.

9. In a stock trough, the combination with spaced supports, of a rod journaled therein, a trough mounted on said rod, a lever having a notch normally engaging said rod, said lever having a slot therein, a stud formed on one wall of the trough and engaging the slot in said lever, a lug formed on the adjacent support coöperating with said notch of the lever for preventing the operation of the lever by an animal, and means for locking the lever in raised position.

10. In a stock trough, the combination with spaced supports, of a rod journaled therein, a trough mounted on said rod, a lever having a notch normally engaging said rod, said lever having a slot therein, a stud formed on one wall of the trough and engaging the slot in said lever, and a lug formed on the adjacent support near the slot and stud connection and coöperating with said notch of the lever for preventing movement of the lever by an animal.

11. In a stock trough, the combination with spaced supports, of a rod journaled therein, a trough mounted on said rod, a lever having a notch normally engaging said rod, said lever also being provided with a slot and a hole therein, a stud formed on one wall of the trough and engaging the slot in said lever, a lug formed on the adjacent support near the slot and stud connection and coöperating with said notch of the lever for preventing movement of the lever by an animal, and a lug formed on said support adjacent the upper end of the lever and adapted to engage the hole in the lever for locking the lever in raised position.

12. In a stock trough, the combination with spaced supports, of a rod journaled therein, a trough mounted on said rod, a lever having a notch normally engaging said rod, said lever also being provided with a slot and a hole therein, a stud formed on one wall of the trough and engaging the slot in said lever, a lug formed on the adjacent support near the slot and stud connection and coöperating with said notch of the lever for preventing movement of the lever by an animal, a lug formed on said support adjacent the upper end of the lever and adapted to engage the hole in the lever for locking the lever in raised position, and a feed chute for said trough.

13. A stock trough, comprising a pair of spaced supports, a rod journaled therein near the outer upper corners thereof, a trough reversibly mounted on said rod, a lever for rocking said trough, a lug on one of the spaced supports for preventing tilting thereof, and a slot and stud connection between the lever and trough for permitting a slight lateral play of the lever to clear said lug.

In testimony whereof I affix my signature in presence of two witnesses.

FRANK A. CRITZ, Jr.

Witnesses:
W. G. ROBERDS,
R. M. GECHETT, Jr.

---

Copies of this patent may be obtained for five cents each, by addressing the "Commissioner of Patents. Washington, D. C."